May 24, 1927. 1,629,838
M. PERDUE
VALVE FOR TOY BALLOONS
Filed May 18, 1925
FIG. 1.
FIG. 2.
FIG. 3.
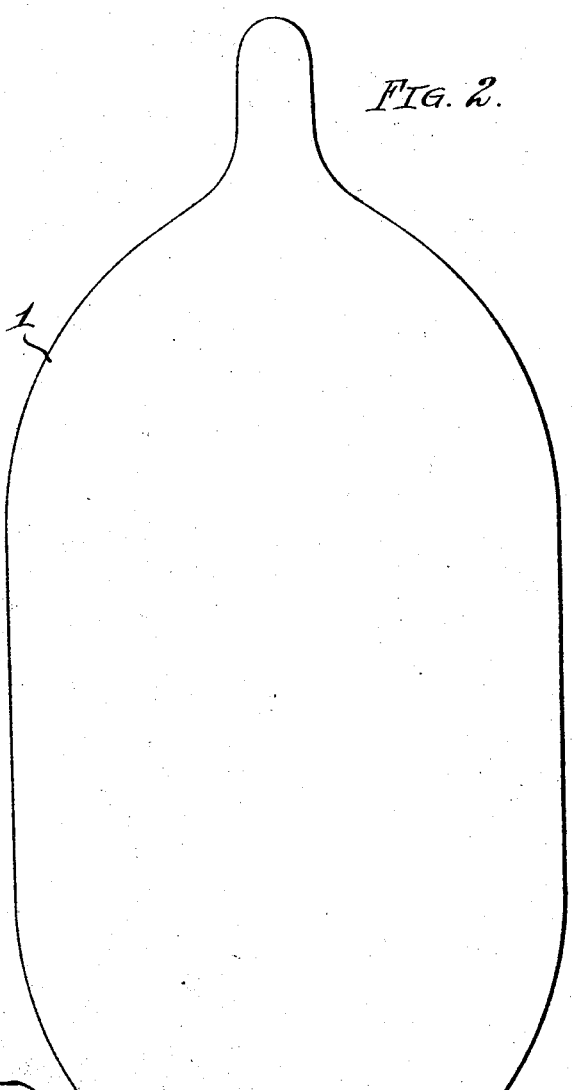
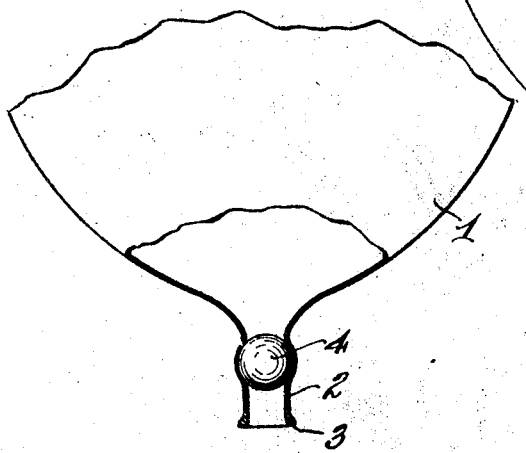
Inventor
Melvin Perdue
By Brockett, Hyde & Milburn
Attorneys Patented May 24, 1927.

1,629,838

UNITED STATES PATENT OFFICE.

MELVIN PERDUE, OF SHELBY, OHIO.

VALVE FOR TOY BALLOONS.

Application filed May 18, 1925. Serial No. 31,033.

This invention relates to improvements in valves for toy balloons and more particularly, to valves of the type loosely carried within the bodies of the balloons and adapted to maintain the balloons in inflated condition by seating or lodging within and thereby closing the necks or mouth pieces of the balloons.

Among the valves of this type which have failed to meet the rigorous requirements for efficient balloon valve operation, has been a hollow rubber ball, but its naturally rough external surface resulted in undue frictional engagement with the balloon and therefore rendered proper seating or lodging of the ball within the balloon neck or mouth piece slow and uncertain and its dislodgment therefrom troublesome. Other unsuccessful balloon valves have had relatively smooth external surfaces but have been of bell or other irregular or non-spherical shapes, with the result that improper seating or lodging of the valve within the balloon neck or mouth piece frequently occurred.

The object of the present invention is to provide an improved balloon valve of this type which is of spherical shape and of non-resilient material, and which is provided with a smooth or polished external surface. Quick and accurate seating or lodging of the valve within the balloon neck or mouth piece is therefore always insured, and its dislodgment therefrom quick and easy.

Further objects of the invention are in part obvious and in part will appear more in detail hereinafter.

In the drawing, Fig. 1 is an elevation of one form of balloon provided with my improved valve, the balloon being in deflated condition; Fig. 2 is an elevation of the balloon in inflated condition with a part thereof broken away to show the valve in partially seated position; and Fig. 3 is a similar view showing the valve in fully seated or lodged position within the balloon neck or mouth-piece.

Referring to the drawing, the balloon comprises a hollow rubber body 1 which may be of any suitable size and shape. It is provided with a tubular neck or mouth-piece 2, faced at its outer end by an annular elastic ring 3 which tends to hold the end of the neck or mouth-piece open.

A small ball 4 of non-resilient material, such as clay, and having a smooth or polished external surface is confined within the body of the balloon and acts as a valve to regulate the influx and egress of air through the neck or mouth-piece 2. The ball, is of course, slightly larger in diameter than that of the tubular mouth-piece, so that when the balloon is inflated or filled with air said ball may be lodged within the balloon neck or mouth-piece, as clearly shown in Fig. 3.

The smooth or polished external surface of the spherical shaped valve, and hence its slightest frictional engagement with the balloon, insures a quick and proper seating or lodging of the ball within the neck or mouth-piece of the balloon when it is desired to maintain the balloon in inflated condition, and its simple and easy dislodgment therefrom when it is desired to inflate the balloon to a greater degree or to deflate the same.

What I claim is:

A toy balloon, comprising a body portion and a tubular neck or mouth piece both of expansible material, and a spherical shaped valve of non-resilient material and having a smooth external surface, said valve being loosely enclosed within said body portion and adapted to maintain the balloon in inflated condition by seating or lodging within and thereby closing the tubular neck or mouth piece thereof.

In testimony whereof I hereby affix my signature.

MELVIN PERDUE.